Feb. 6, 1934.   L. J. PAGE   1,946,233
TYPE OF EYEGLASS AND SPECTACLE MOUNTING OR BRIDGE
Filed June 26, 1931
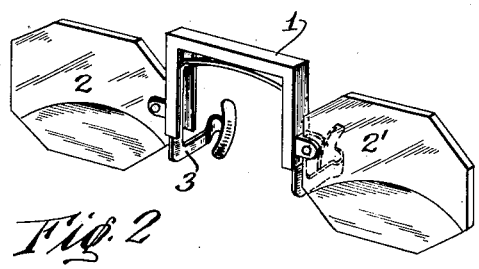
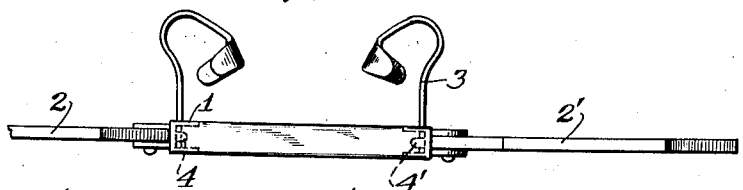
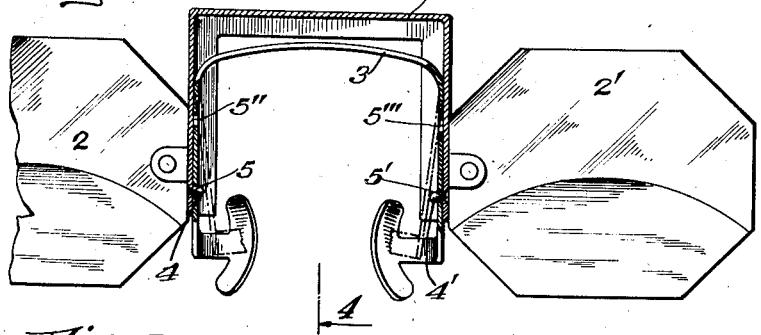
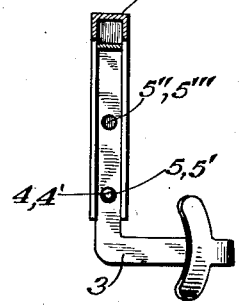
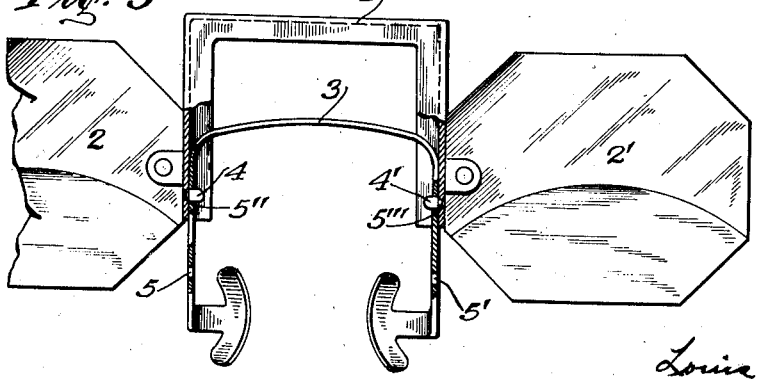
INVENTOR
Louis John Page Patented Feb. 6, 1934

1,946,233

UNITED STATES PATENT OFFICE 1,946,233

TYPE OF EYEGLASS AND SPECTACLE MOUNTING OR BRIDGE

Louis John Page, Brooklyn, N. Y.

Application June 26, 1931. Serial No. 547,037

REISSUED

7 Claims. (Cl. 88—49)

The adjustable bifocal mounting is an eyeglass bridge which permits the wearer of bifocal lenses to raise and lower the glasses so that the reading section of the lenses may be raised to a level with the eye and lowered when not in use.

The adjustable bifocal mounting is a bridge which may be fitted to rims holding lenses or to straps which fit directly to the lenses.

The mounting consists of two parts—the outer part which is fitted to the rims or lenses is rigid and grooved to hold the inner part. The inner part which is fitted with nose pads moves up and down in grooves of the outer part.

Figure 1 is a perspective view of a pair of eye glasses equipped with the adjustable bifocal mounting, with the lenses adjusted for distant vision.

Figure 2 is a top view of the device shown in Figure 1.

Figure 3 is a view from the back as opposed to the front view shown in Figure 1, with the bridge connecting the two lenses shown in section, and the adjustable auxiliary nose piece shown in full, locked in position for far vision and dotted as compressed to release from the prongs.

Figure 4 is a view through the section 4—4 of Figure 3 and shows the inner nose piece locked on the prongs.

Figure 5 is identical with Figure 3, except that the auxiliary bridge is shown in position to allow use of the lower portion of the bifocal lenses.

All of the drawings show an outer grooved high bridge structure, "bridge 1", which joins the two lenses 2 and 2' and holds them in position, and an inner structure, "auxiliary nose piece 3", which rests on the nose and is arranged to slide up and down in the outer grooved structure 1. This inner structure 3 has perforations 5, 5', 5'' and 5''' so placed that these engage with pins 4 and 4' on the outer grooved structure 1, thus enabling locking of the frame into position at whatever height is required. No springs or screws are used in this apparatus, the relative positions of the two members being fixed by the prongs and perforations and the resilient nature of the inner structure. While the bridge may be made of resilient material, the construction for successful operation requires that the bridge substantially be rigid, so as not to change shape under the pressure of the resilient auxiliary nose piece.

While this particular illustration shows eye glasses and a particular form of nose pads, I do not limit myself to this application as this same principle may be applied to spectacles wherein the nose pads merely rest on the nose and do not grip it firmly. I do not limit myself to the particular design of bridge shown, as this may be made much less conspicuous and of different shape, but still permit operation in accordance with the principles set down. For further convenience, the inner bridge equipped with nose pads may be provided with projecting ears so as to permit easier manipulation of the inner bridge by contracting the bridge by pressure on these ears.

I am aware that prior to my invention eye glass and spectacle bridges or mountings have had pads which rest on the sides of the bridge of the nose, that the lenses were held in place by a bar arching the nose and apparently of the same appearance as the adjustable bifocal mounting,—but I do claim:

1. In a nose-piece structure for spectacles, eye-glasses, and the like, a bridge having substantially vertical members, said vertical members being provided with grooves and being fitted with two prongs on either side of the said vertical members, an auxiliary nose piece provided with several sets of holes placed to engage the prongs in said bridge and arranged to slide within the grooves of said bridge, maintaining contact therewith by virtue of the resilient properties of the auxiliary nose-piece structure.

2. In a nose-piece structure for spectacles, eye-glasses, and the like, a high bridge fitted to the lenses having substantially vertical members, said vertical members being provided with grooves and being fitted with two prongs on either side of the said vertical members, an auxiliary nose piece remaining stationary on the nose provided with several sets of holes placed to engage the prongs in said bridge and arranged to slide within the grooves of said bridge, maintaining contact therewith by virtue of the resilient properties of the auxiliary nose-piece structure.

3. In a nose-piece structure for spectacles, eye-glasses, and the like, a high bridge of non-resilient material fitted to the lenses, having substantially vertical members, and fitted with two prongs one on either side of the said vertical members, an auxiliary nose piece of resilient material, fitted with nose pads maintaining their position on the nose, said auxiliary nose piece provided with several sets of holes so placed as to engage the prongs in said bridge.

4. In a nose-piece structure for spectacles, eye-glasses, and the like, a high bridge of non-resilient material fitted to the lenses, having substantially vertical members, said vertical members being provided with grooves and being fitted with two prongs on either side of the said vertical members, an auxiliary nose piece of resilient material, fitted with nose pads maintaining their position on the nose, said auxiliary nose piece provided with several sets of holes placed to engage the prongs in said bridge and arranged to slide within the grooves of said bridge, maintaining contact therewith by virtue of the resilient properties of the auxiliary nose-piece structure.

5. In a nose-piece structure for spectacles, eyeglasses, and the like, a high bridge of non-resilient material fitted to the lenses, having substantially vertical members, these members being grooved and fitted with two prongs, one on either side of said vertical members, an auxiliary nose piece of resilient material, fitted with nose pads maintaining their position on the nose, said auxiliary nose piece provided with several sets of holes placed to engage the prongs in said bridge and arranged to slide within the grooves of said bridge maintaining contact therewith, and the holes of said nose-piece engaging the prongs of said bridge and locking the position by virtue of the resilient properties of said auxiliary nose-piece structure.

6. In a nose-piece structure for spectacles, eyeglasses, and the like, a bridge having two substantially vertical members, said members each being provided with a groove and being fitted with a portion of a latching device, an auxiliary nose piece provided with the remaining portions of said latching device and placed so as to engage the portions fitted to said bridge, and said nose piece also being arranged to slide within the grooves of said bridge, maintaining contact therewith by virtue of the resilient properties of the auxiliary nose-piece structure.

7. In a nose-piece structure for spectacles, eyeglasses, and the like, a high bridge of non-resilient material fitted to the lenses, having two substantially vertical members, said members each being provided with a groove and being fitted with a portion of a latching device, an auxiliary nose piece of resilient material fitted with nose pads maintaining their position on the nose, said nose piece being provided with the remaining portions of said latching device and placed so as to engage the portions fitted to said bridge, and said nose piece being arranged to slide within the grooves of said bridge maintaining contact therewith, and the portions of the latching device on the nose piece together with the portions of the latching device on the bridge operating to lock the position by virtue of the resilient properties of said auxiliary nose-piece structure.

LOUIS JOHN PAGE.